United States Patent
Tarlau et al.

(10) Patent No.: US 10,218,043 B2
(45) Date of Patent: Feb. 26, 2019

(54) DUAL PHASE BATTERY COOLING SYSTEM

(71) Applicant: Faraday & Future Inc., Gardena, CA (US)

(72) Inventors: David Tarlau, Torrance, CA (US); W. Porter Harris, Los Angeles, CA (US); Pei Chen, Torrance, CA (US); Berton Vite, Costa Mesa, CA (US)

(73) Assignee: FARADAY & FUTURE INC., Gardena, CA (US)

( * ) Notice: Subject to any disclaimer, the term of this patent is extended or adjusted under 35 U.S.C. 154(b) by 490 days.

(21) Appl. No.: 14/972,573

(22) Filed: Dec. 17, 2015

(65) Prior Publication Data
US 2017/0092999 A1    Mar. 30, 2017

Related U.S. Application Data

(60) Provisional application No. 62/232,226, filed on Sep. 24, 2015, provisional application No. 62/232,719, filed on Sep. 25, 2015.

(51) Int. Cl.
*H01M 10/6569*    (2014.01)
*H01M 10/613*    (2014.01)
(Continued)

(52) U.S. Cl.
CPC .... *H01M 10/6569* (2015.04); *F28D 15/0233* (2013.01); *F28D 15/046* (2013.01);
(Continued)

(58) Field of Classification Search
CPC ........... H01M 10/6569; H01M 10/613; H01M 10/6557; H01M 10/6568
(Continued)

(56) References Cited

U.S. PATENT DOCUMENTS

| | | |
|---|---|---|
| 4,578,324 A | 3/1986 | Koehler et al. |
| 4,578,325 A | 3/1986 | Koehler et al. |

(Continued)

FOREIGN PATENT DOCUMENTS

| | | |
|---|---|---|
| JP | 11-233136 A | 8/1999 |
| WO | WO 2010/099355 A2 | 9/2010 |
| WO | WO 2014/176320 A2 | 10/2014 |

OTHER PUBLICATIONS

International Search Report and Written Opinion in PCT/US2016/052699, dated Jan. 3, 2017.

*Primary Examiner* — Gary D Harris
(74) *Attorney, Agent, or Firm* — Knobbe Martens Olson & Bear LLP

(57) ABSTRACT

A cooling system for a battery cell. In one embodiment, the cooling system includes a wicking material and a first cooling liquid; a battery cell support to hold the battery cell in communication with the wicking material; a first cooling channel having a wall, the wall having an interior and an exterior surface, the interior surface of the wall defining a lumen, the exterior surface of the wall of the first cooling channel in communication with the wicking material; whereby a first cooling fluid is passed through the lumen of the first cooling channel, whereby the first cooling liquid in the wicking material vaporizes in response to heat radiating from the battery cell, and whereby the vaporized first cooling liquid condenses upon contact with the wall of the first cooling channel and is wicked by the wicking material.

16 Claims, 11 Drawing Sheets

(51) Int. Cl.
  *H01M 10/6557*  (2014.01)
  *H01M 10/6568*  (2014.01)
  *F28D 15/02*    (2006.01)
  *F28D 15/04*    (2006.01)

(52) U.S. Cl.
  CPC ..... *H01M 10/613* (2015.04); *H01M 10/6557* (2015.04); *H01M 10/6568* (2015.04)

(58) Field of Classification Search
  USPC ........................................................ 429/120
  See application file for complete search history.

(56) References Cited

U.S. PATENT DOCUMENTS

2011/0300428 A1* 12/2011 Sohn .................. H01M 2/1066
                                                       429/120
2012/0231317 A1    9/2012 Shimizu et al.

\* cited by examiner

DUAL PHASE BATTERY COOLING SYSTEM

RELATED APPLICATIONS

This application claims priority to U.S. Provisional Applications 62/232,226, filed Sep. 24, 2015 and 62/232,719, filed Sep. 25, 2015, the contents of both being incorporated herein by their entireties.

FIELD OF THE INVENTION

The invention relates generally to battery packs and more specifically to a cooling systems for cooling battery packs.

BACKGROUND OF THE INVENTION

Batteries generate heat both when charging and when in use. The chemical changes that occur in a battery in moving charge among the chemical components to generate electricity are the source of this heat. The heat generated affects the internal resistance of the battery cell and thereby affects the output voltage generated by the battery and amount of battery life in general. It is therefore important to remove heat from the battery as it is produced.

Traditional battery cooling systems rely on the thermal exchange properties of a single-phase heat transfer material, such as a fluid passed by the cells or a bulk metal heat sink to dissipate heat from the battery. Heat that enters the cooling fluid or the heat sink is then removed from the fluid and the heat sink through contact with the environment. What is needed is a method to remove more heat from the battery without having to increase the ancillary components such as pumps or condensers.

The present invention addresses these need.

SUMMARY OF THE INVENTION

In one aspect, the invention relates to a cooling system for a battery cell having a top surface and a bottom surface. In one embodiment, the cooling system includes a wicking material and a first cooling liquid; a battery cell support configured to hold the battery cell in communication with the wicking material; a first cooling channel having a wall, the wall having an interior and an exterior surface, the interior surface of the wall of the cooling channel defining a lumen, the exterior surface of the wall of the first cooling channel in communication with the wicking material; whereby a first cooling fluid is passed through the lumen of the first cooling channel, whereby the first cooling liquid in the wicking material vaporizes in response to heat radiated from the battery cell, and whereby the vaporized first cooling liquid condenses upon contact with the wall of the first cooling channel and is wicked by the wicking material. In another embodiment, the vaporized first cooling liquid transfers heat to the second cooling fluid via condensation of the first cooling liquid on the wall of the first cooling channel. In another embodiment, the battery support holds the bottom surface of the battery cell in communication with the wicking material. In yet another embodiment, the battery support holds a portion of the battery cell in communication with the wicking material. In still yet another embodiment, the wicking material defines a hole having a first end and a second end, the first end of the hole terminating adjacent the exterior surface of the wall of the cooling channel, wherein the battery cell support is configured to hold the battery cell such that a portion of the bottom surface of the battery cell is positioned over the second end of the hole, and whereby the vaporized first cooling liquid moves away from the portion of the bottom surface of the battery cell through the hole and condenses on the exterior surface of the wall of the first cooling channel.

In one embodiment, the wicking material is a structural cylinder having a diameter similar to the diameter of the battery cell and defining a hole having a first end and a second end, the first end of the hole terminating adjacent to the exterior surface of the wall of the cooling channel, wherein the battery cell support is configured to hold the battery cell such that a portion of the bottom surface of the battery cell is positioned over the second end of the hole, and whereby vaporized first cooling liquid moves away from the bottom surface of the battery cell through the hole and condenses on the exterior surface of the wall of the first cooling channel. In another embodiment, the cooling system comprises at least two structural cylinders of wicking material interconnected by an extension of wicking material. In another embodiment, the wicking material is selected from a group consisting of high thermal conductivity materials including, but not limited to, copper, stainless steel, aluminum, carbon steel, silver, carbon fiber, and graphite. In still another embodiment, the first cooling liquid is selected from a group consisting of two-phase fluids including, but not limited to, ammonia, Flutec PP1, Flutec PP3, Flutec PP6, Flutec PP2, Flutec PP9, Freon 11, Freon 113, alcohol, methanol (283-403 K), and ethanol (273-403 K). In another embodiment, the first cooling liquid is a thermal liquid optimized for phase change cooling between temperatures of 273K and 323K. In yet another embodiment, the first cooling fluid is selected from a group including, but not limited to, synthetic oil, ethylene glycol, water, a liquid dielectric, or combinations thereof. In still yet another embodiment the cooling system includes a second cooling channel, the wicking material being positioned between the first and second cooling channels and defining a plurality of holes extending between the first and second cooling channels. In another embodiment, the wicking material defines a hole parallel to the longitudinal axis of the battery cell. In yet another embodiment, the cooling channel and the wicking material are positioned adjacent to the wall of the battery cell. In another embodiment, the first cooling channel and the wicking material are positioned adjacent to the top of the battery cell. In yet another embodiment, the first cooling channel and the wicking material are positioned adjacent to the top of the battery cell and the wicking material is positioned to define a plenum between the top of the battery cell and the wall of the first cooling channel. In another embodiment, the diameter of the first cooling channel is substantially the same diameter as the top of the battery cell that the first cooling channel is adjacent to. In yet another embodiment, the diameter of the first cooling channel is substantially smaller than the diameter of the top of the battery cell that the first cooling channel is adjacent to.

In another aspect, the invention relates to a cooling system for a battery cell having a top surface and a bottom surface. In one embodiment, the cooling system includes a wicking material and a first cooling liquid; a battery cell support configured to hold the battery cell in communication with the wicking material; a first cooling channel having a wall, the wall having an interior and an exterior surface, the exterior surface of the wall of the first cooling channel in communication with the wicking material; whereby a first cooling fluid is passed through the first cooling channel, whereby the viscosity of the first cooling liquid in the wicking material is reduced in response to heat from the battery cell, and whereby the viscosity of the first cooling liquid increases upon contact with the wall of the first cooling channel and is wicked by the wicking material. In another embodiment, a portion of the first cooling liquid transfers heat without undergoing a phase change.

In yet another aspect, the invention relates to a cooling system for a battery cell having a top surface and a bottom surface. In one embodiment, the cooling system includes a wicking material; a first cooling liquid having a first state and a second state; a battery cell support configured to hold the battery cell in communication with the wicking material; a first cooling channel having a wall, the wall having an interior and an exterior surface, the exterior surface of the wall of the first cooling channel in communication with the wicking material; whereby a first cooling fluid is passed through the first cooling channel, whereby the first cooling liquid in the wicking material undergoes a phase change from the first state to the second state in response to heat from the battery cell, and whereby the first cooling liquid changes from the second state to the first state upon contact with the wall of the first cooling channel and is wicked by the wicking material.

BRIEF DESCRIPTION OF THE DRAWINGS

The structure and function of the invention can be best understood from the description herein in conjunction with the accompanying figures. The figures are not necessarily to scale, emphasis instead generally being placed upon illustrative principles. The figures are to be considered illustrative in all aspects and are not intended to limit the invention, the scope of which is defined only by the claims.

DESCRIPTION OF A PREFERRED EMBODIMENT

Figure 1:
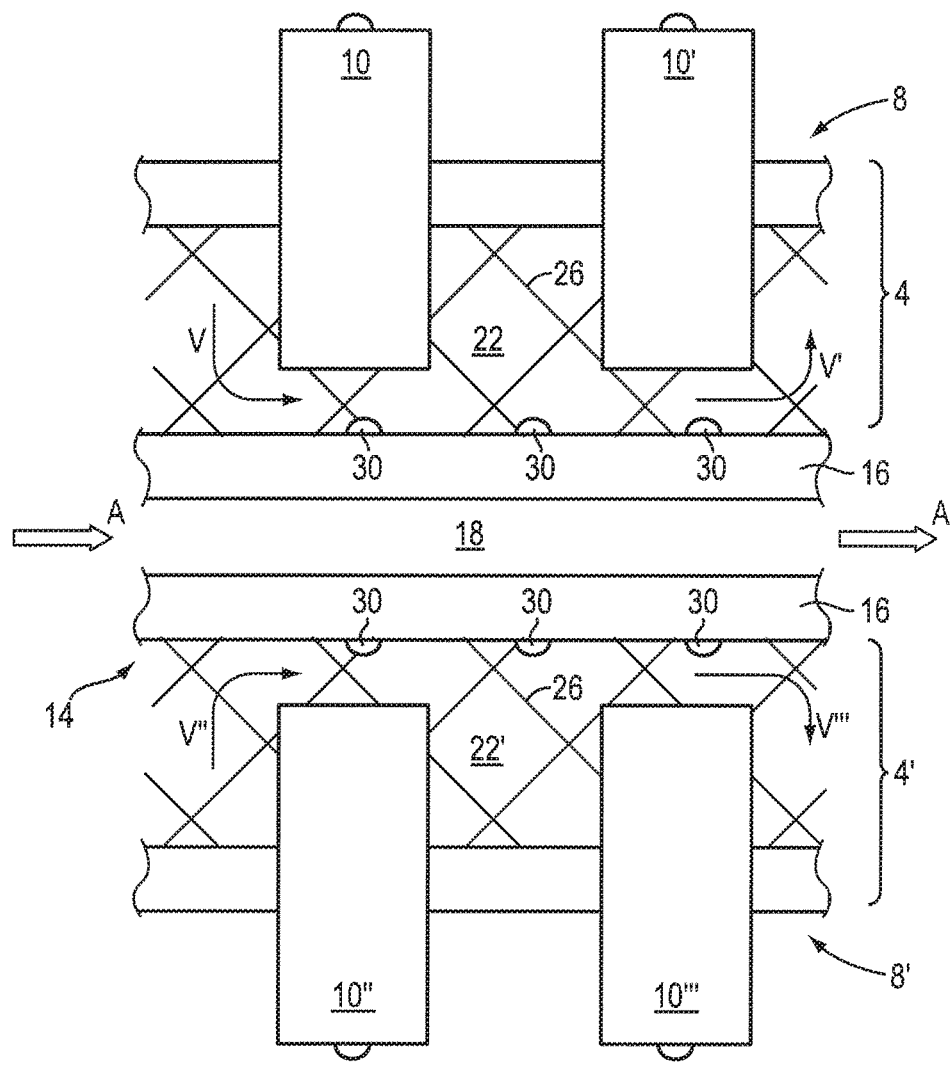
FIG. 1 is a cross-sectional view of an embodiment of two battery modules positioned upon a battery pack cooling channel.

In brief overview and referring to FIG. 1, in general, the various embodiments of battery cooling devices constructed in accordance with the invention include two battery modules 4, 4' (generally 4), each of which includes a support surface 8, 8' (generally 8) which support a plurality of battery cells 10, 10', 10", 10''' (generally 10). The battery modules 4 are placed back to back upon a battery pack cooling channel 14. The cooling channel 14 includes a wall 16 that acts as a heat sink for the battery modules 4. A cooling fluid, for example, synthetic oil, ethylene glycol, water, a liquid dielectric, combinations thereof or a gas (arrows A) flows through the lumen 18 of the cooling channel 14 and removes heat transferred to the wall 16 of the cooling channel, from the battery modules 4. This cooling system utilizes a two-phase closed system that couples a thermal liquid optimized for phase change cooling combined with a high thermal conductivity wicking material, for example, copper, stainless steel, aluminum, carbon steel, silver, carbon fiber, and graphite that provides a lattice whereby the cooling liquid is moved via capillary action. In some embodiments, the thermal liquid is optimized for phase change cooling at temperatures between 273 K and 323K. In other embodiments the liquid does not change phase but undergoes a change in viscosity as heat enters or leaves the liquid.

Each battery module 4 includes a cooling space 22, 22' (generally 22) respectively, formed in part by the wall 16 of the cooling channel 14 and the support surface 8. Each space 22 is filled with a wicking material 26 wet by a two-phase cooling fluid, for example, ammonia, Flutec PP1, Flutec PP3, Flutec PP6, Flutec PP2, Flutec PP9, Freon 11, Freon 113, alcohol, methanol (283-403 K), and ethanol (273-403 K). Additional walls extend between the wall 16 of the cooling channel 14 and the support surface 8. The battery cells 10 are also sealed against the opening in the support surface 8 in which they each reside. This configuration encloses the cooling spaces 22 in a vapor-proof container.

As the battery cells are used and charged, they generate heat. The heat passes through the base of the battery cell 10, causing the cooling liquid associated with the wicking material to vaporize, thereby removing heat from the battery cell 10. The resulting vapor V, V', V", V''' diffuses through the wicking material, eventually being cooled by the wall 16 of the cooling channel 14. This cooling causes the vapor to form a condensate 30 on the exterior surface of the wall 16 of the cooling channel 14. This condensed cooling liquid is then wicked by the wicking material 26 and brought back into contact with the battery cells 10. At this time the cycle repeats, removing more heat from the battery cells 10. This combination of wicking material and liquid along with the cooling channel wall forms a closed, passive system in the cooling spaces 22 that constantly transfers heat from the battery cells 10 to the cooling fluid A.

Figure 2:
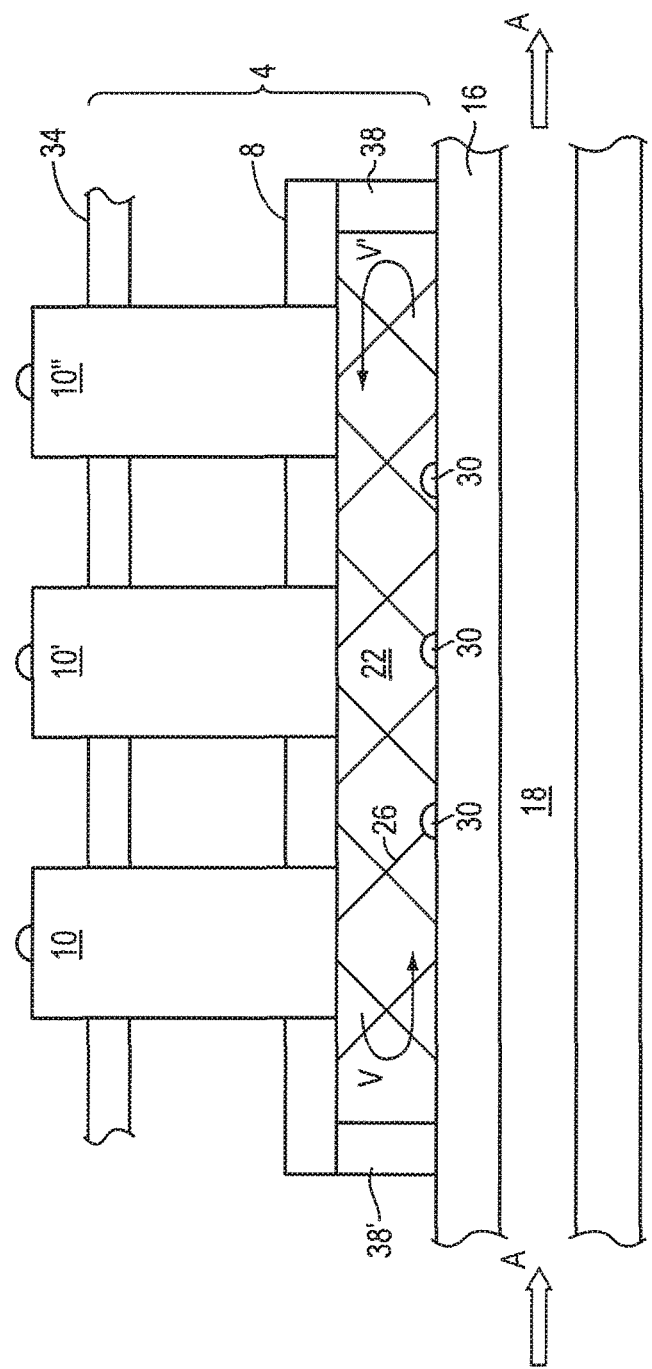
FIG. 2 is a cross-sectional view of an embodiment of a battery pack module positioned upon a battery pack cooling channel.

In more detail, and considering various embodiments, FIG. 2 depicts an embodiment of the invention, showing only one of the battery modules 4 for clarity. In this embodiment, a second support surface 34 supports battery cells 10, 10', 10"" (generally 10) along with support surface 8. In this embodiment, the bases of the battery cells 10 are coplanar with the bottom of the support surface 8. Again, the walls of the battery cells 10 are sealed against the support surface 8 to form, along with walls 38, 38', an enclosed space 22 with the wall 16 of the cooling channel 14.

As discussed above, the cooling space 22 is filled with a wicking material associated with a cooling liquid. As heat passes through the base of the battery cell 10, the cooling liquid associated with the wicking material evaporates, removing heat from the battery cell 10. The resulting vapor V, V' diffuses through the wicking material and is cooled by proximity to the wall 16 of the cooling channel 14. The vapor then condenses 30 on the wall 16 of the cooling channel 14, and is wicked by the wicking material 26 and eventually brought back into contact with the battery cells 10. The evaporation and condensation cycle then repeats.

Figure 3:
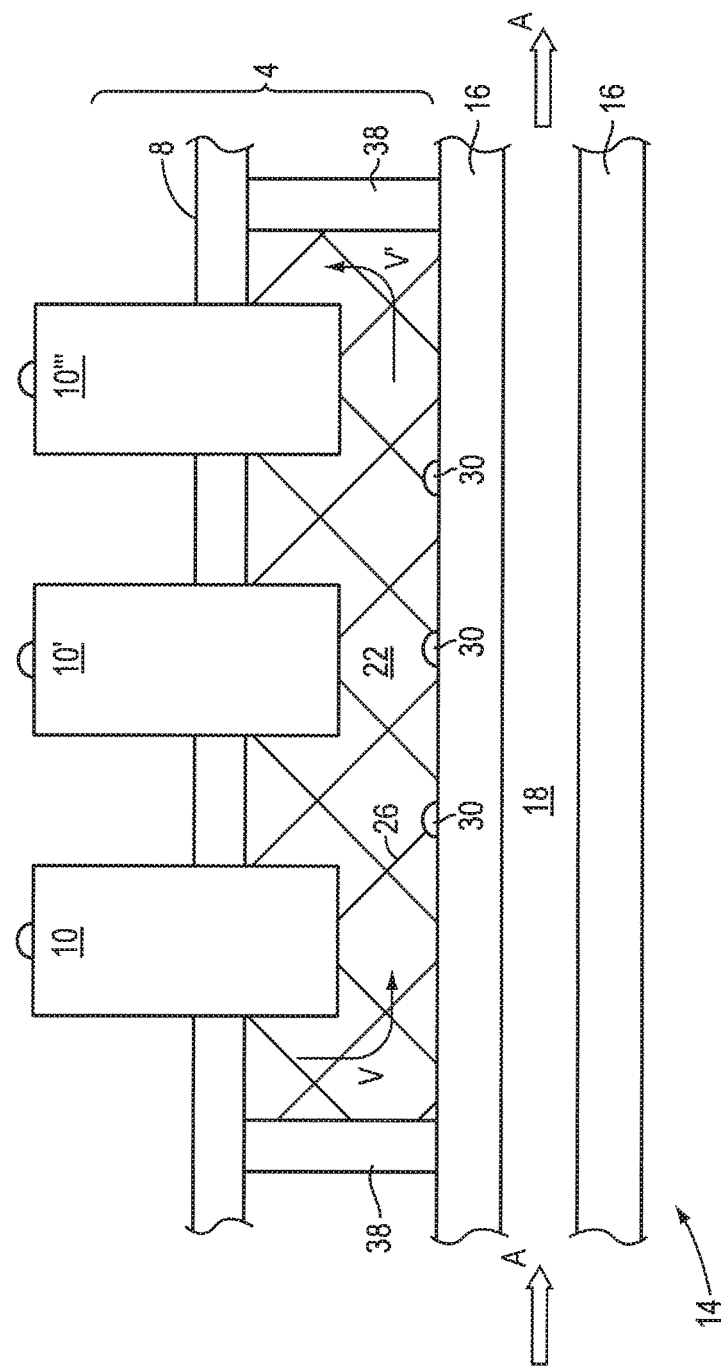
FIG. 3 is a cross-sectional view of another embodiment of a battery pack module positioned upon a battery pack cooling channel.

FIG. 3 depicts another embodiment of the invention, again showing only one of the battery modules 4 for clarity. This embodiment is similar to the general embodiment shown in FIG. 1. In this embodiment, a support surface 8 supports plurality of battery cells 10, 10', 10"", upon a battery pack cooling channel 14. As previously described, the cooling channel 14 includes a wall 16 that acts as a heat sink for the battery modules 4. A cooling fluid (arrows A) flows through the lumen 18 of the cooling channel 14 removing heat transferred to the wall 16 of the cooling channel.

Each battery module 4 includes a cooling space 22 formed by the wall 16 of the cooling channel 14 and the support surface 8. The cooling space 22 is filled with a wicking material 26 wet by a cooling liquid. The distance between the wall 16 of the cooling channel 14 and the support surface 8 includes a wall 38 extending from the wall of the cooling channel 14 to the support surface 8. The battery cells 10 are also sealed against the opening in the support surface 8 in which they each reside to enclose the cooling space 22 in a vapor-proof container. The battery cells 10, unlike the previous embodiment, extend further into the cooling space 22. This allows additional heat to escape from the battery cell 10 through the walls of the battery cell 10. It should be noted that in a typical "jelly-roll" constructed battery cell 10, in which the internal components of the battery are wrapped in a spiral about a central electrode, most of the heat is removed through the base of the battery. This is because the heat from the center of the spiral-wound battery components must pass through other heat generating portions of the spiral to escape through the walls of the battery. However, the ability to remove additional heat through the wall of the battery cell proves useful in other battery configurations in which the components are not wound in a spiral.

As discussed previously, the cooling liquid associated with the wicking material is caused to vaporize by the heat generated by the battery cell 10. The vapor V, V' diffuses through the wicking material, eventually coming in contact with and being cooled by the wall 16 of the cooling channel 14. This causes the vapor to form a condensate 30 that is then wicked by the wicking material 26 back into contact with the battery cells 10. This cycle repeats, constantly removing heat from the battery cells 10.

Figure 4:
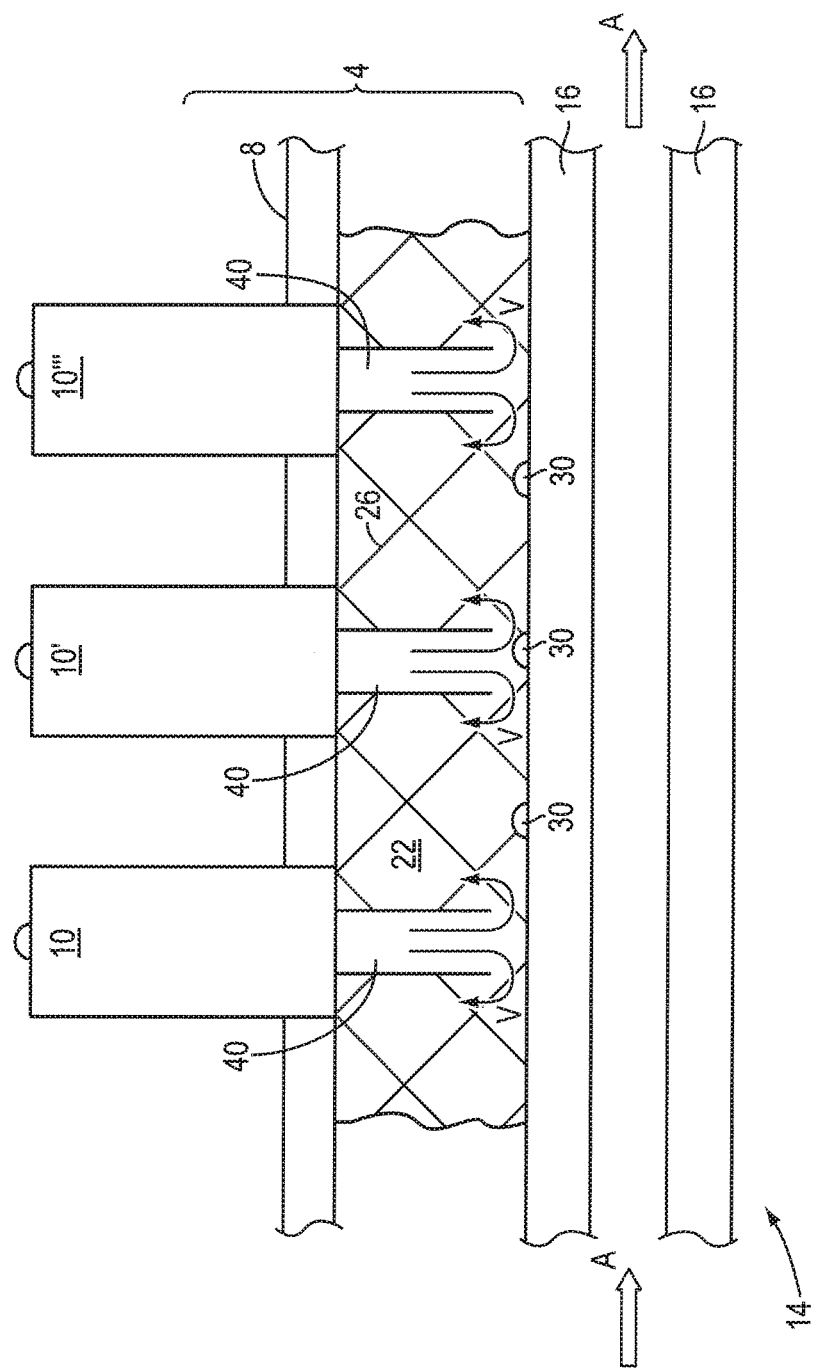
FIG. 4 is a cross-sectional view of yet another embodiment of a battery pack module positioned upon a battery pack cooling channel.

The next embodiment shown in FIG. 4 is similar to the design in FIG. 2, with the bottom of the battery cells 10 level with a support surface 8. However in this embodiment, rather than having the wicking material 26 loosely packed in the cooling space 22, the wicking material 26 is structured such that a series of holes 40 are supported by the wicking material 26. These holes have a diameter smaller than the diameter of a battery cell 10 and extend from the bottom of the battery cell 10 to the wall 16 of the cooling channel 14. In this way, the vapor that forms from the evaporation of the cooling liquid associated with the wicking material can more easily diffuse to the wall 16 of the cooling channel 14 where it condenses and is wicked back to the bottom of the battery (arrows V).

Figure 5:
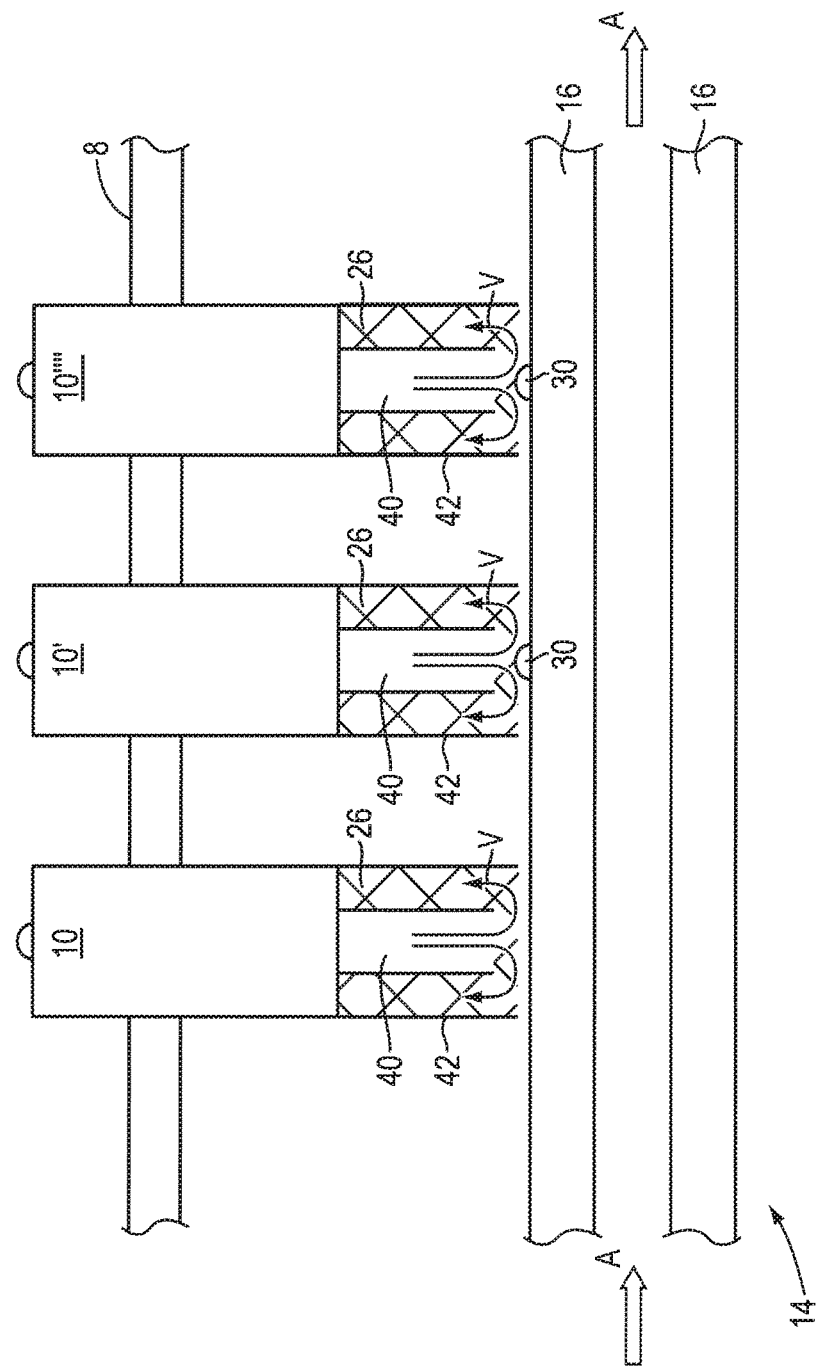
FIG. 5 is a cross-sectional view of still yet another embodiment of a battery pack module positioned upon a battery pack cooling channel.
Figure 6:
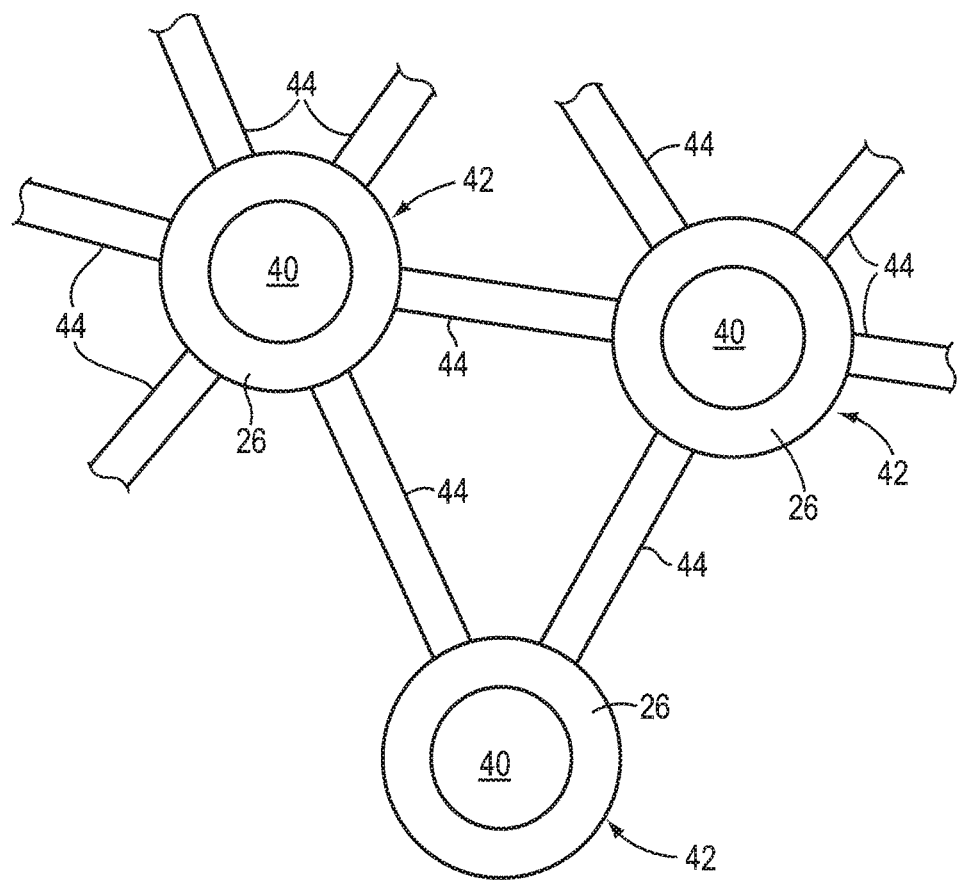
FIG. 6 is plan view of an embodiment of the device of FIG. 5.

The next embodiment, FIG. 5, is similar to the embodiment of FIG. 3, except the wicking material 26 is not only structured to support a series of holes 40, but the wicking material making contact with the base of the battery cell 10 is limited in size to about or slightly greater than the diameter of the base of the battery cell 10. These wicking pillars 42 define a hole 40 that permits vapor to move from the bottom of the battery cell 10 to the wall 16 of the cooling channel 14 as discussed in the previous embodiment. Referring also to FIG. 6, to equilibrate the removal of heat from different battery cells 10, the wicking pillar 42 of one battery cell is also in contact with the wicking pillars 42 of other battery cells through wicking extensions 44 that connect the wicking pillars 42. In this way, wicking liquid may be drawn to the battery cells generating the most heat.

Figure 7:
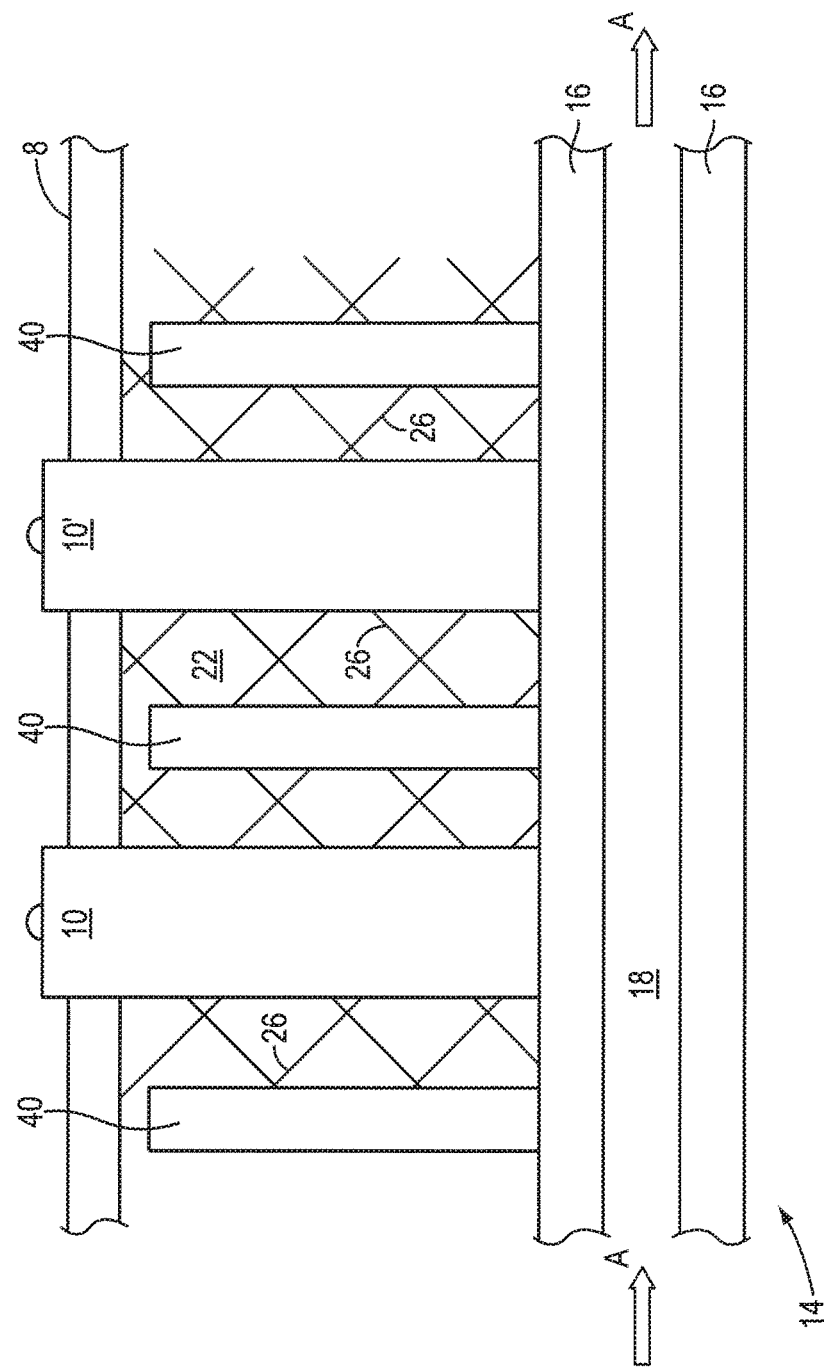
FIG. 7 is a cross-sectional view of still yet another embodiment of a battery pack module positioned upon a battery pack cooling channel.

Referring to FIG. 7, this embodiment is similar to that shown in FIG. 3, only in this embodiment holes or channels 40 extend from the wall 16 of the cooling channel through the wicking material 26, to aid in the transfer of vapor to the cooling channel to aid in condensation.

Figure 8:
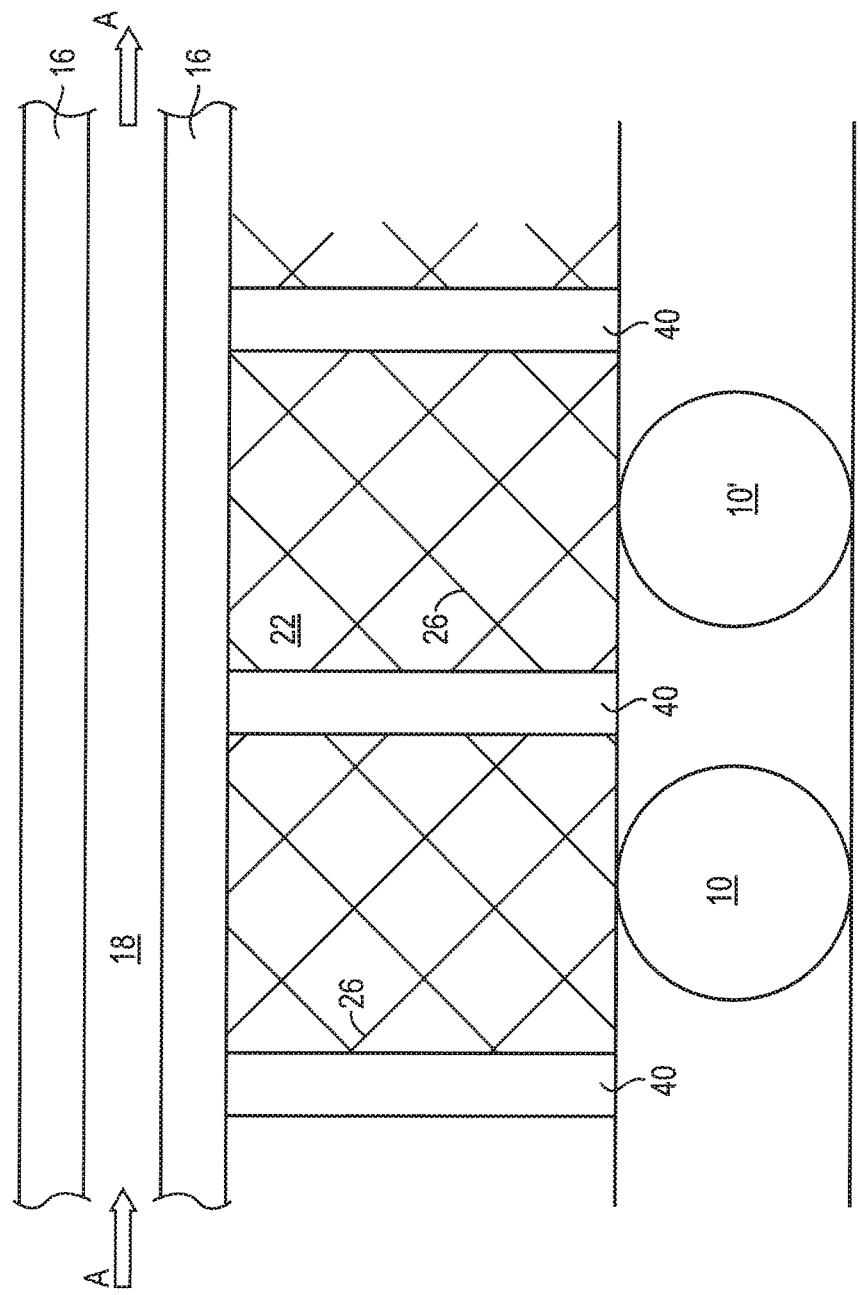
FIG. 8 is a cross-sectional view of another embodiment of a battery pack module positioned adjacent to a battery pack cooling channel.
Figure 9:
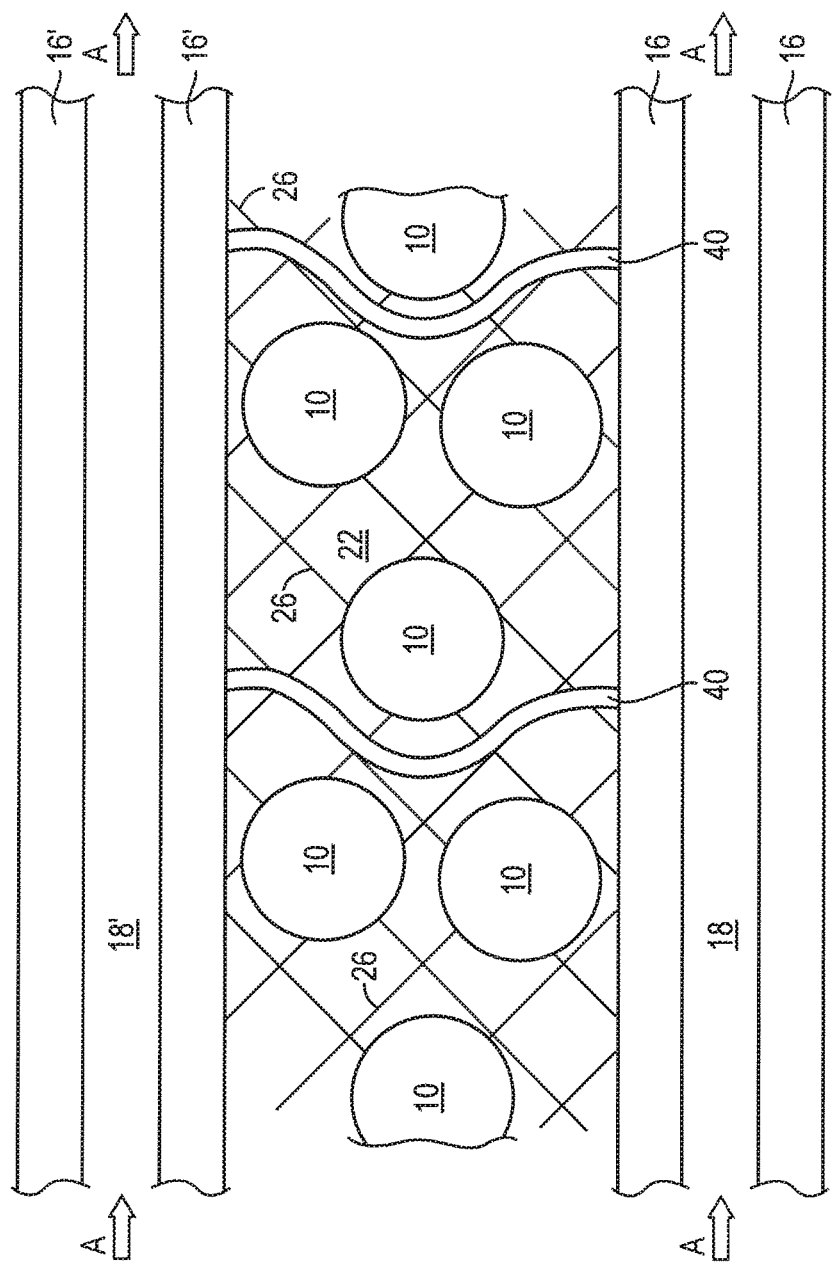
FIG. 9 is a cross-sectional view of another embodiment of a battery pack module positioned adjacent to a battery pack cooling channel.

Referring to FIG. 8, although the concept is the same, in the embodiment of FIG. 8 the battery cells 10, 10' are positioned on their sides and the cooling spaces 22, wicking material 26, holes or channels 40 and the cooling channel 18 are positioned above the battery cells 10. In addition, this embodiment is constructed to remove heat through the wall of the battery cells 10 and not bottom of the cells. Again, the channels 40 help move the cooling vapor to the wall 16 of the cooling channel 18.

Referring to FIG. 5, each battery cell 10 may be oriented on its side and offset-stacked with other battery cells 10. In this configuration, because the heat transfer from the side of the "jelly-roll" battery cell 10 as discussed above is not as efficient, two cooling channels are used to cool the vapor from the wicking material 26. In this embodiment, the wicking material 26 is packed in the cooling space 22 and the vapor holes or channels 40 are serpentine to pass between the offset battery cells 10. The ends of the vapor hole or channel terminate at the walls 16' of the cooling channel for condensation as discussed in the other embodiments.

The previous embodiments were described in terms of cylindrical battery cells 10 in which the internal components of the cells were wound spirally about an electrode. Another form of the battery cell is the flat or "pouch" battery cell 60. In these battery cells, the components are flat layers that are stacked together with the two battery electrodes 64 being brought out through any edge of the stacked layers. Although the cooling principle in these cells is the same as the principle in cylindrical cells, their flat sides make it possible to have additional configurations.

Figure 10B:
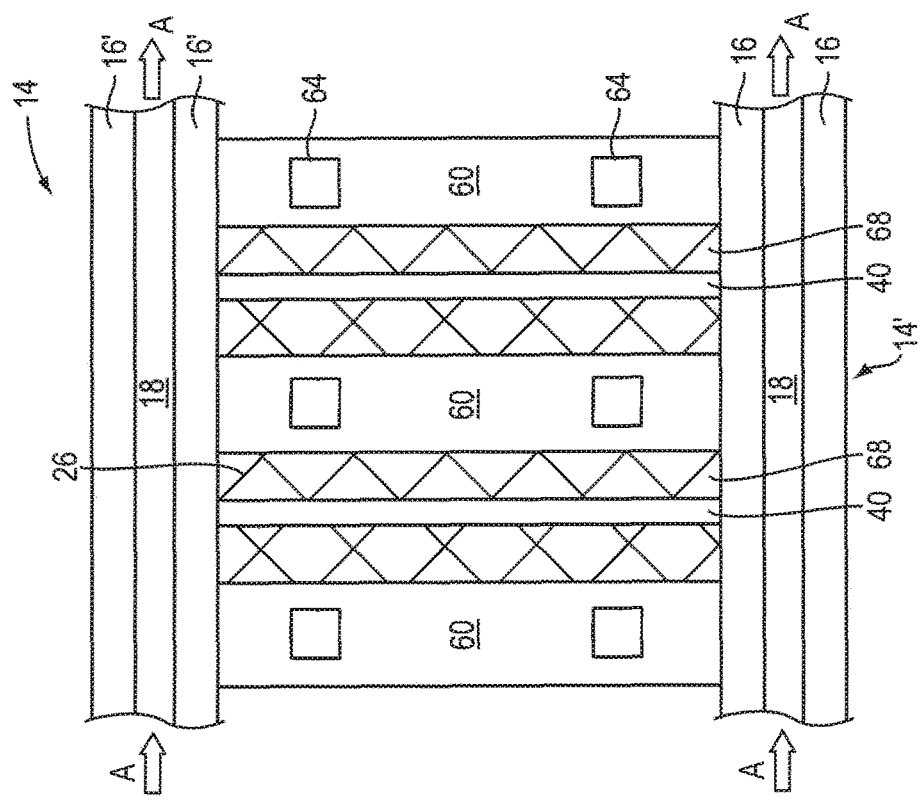
FIG. 10(B) is a front view of the embodiment of FIG. 10(A)
Figure 10A:
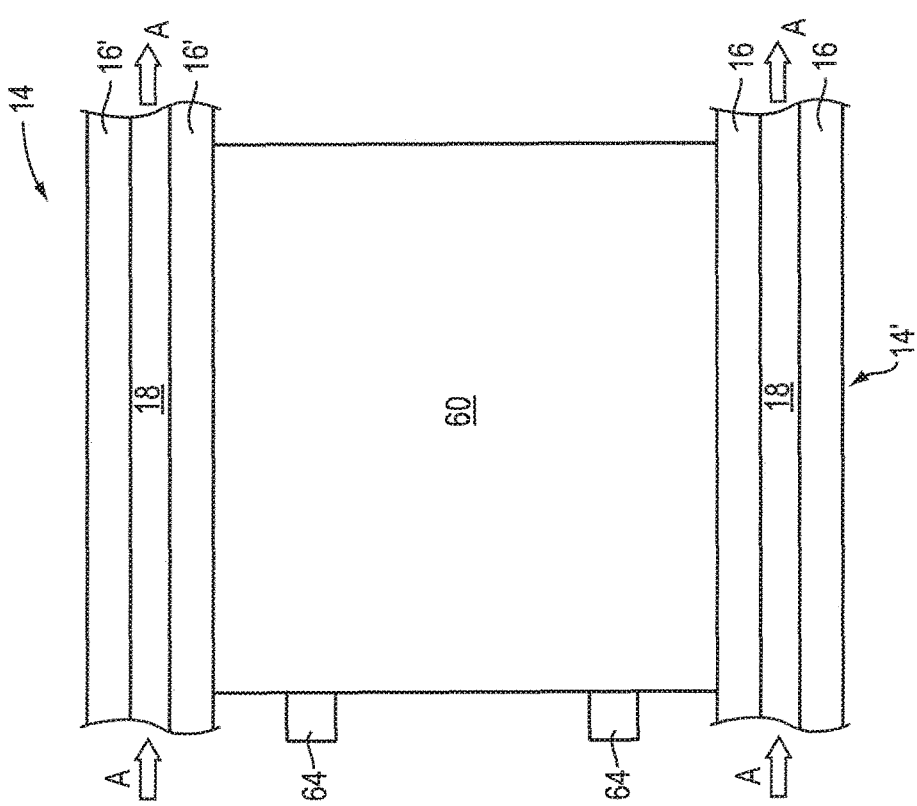
FIG. 10(A) is a side view of an embodiment of a "pouch" battery cell positioned between two cooling channels.

Referring to FIGS. 10(A) and (B), in one embodiment, the battery cells 60 are placed between two cooling channels through which a cooling fluid, as discussed above, is passed (arrows A). In one embodiment, between each cell is a cooling space 68 containing the wicking material 26 and a vapor channel or hole 40 that extends from one cooling channel 14 to the other 14'. As the heat is extracted from the sides of the battery cells 60, the cooling liquid is evaporated from the wicking material 26 and passes through the vapor hole or channel 40 to condense on the walls 16, 16' of the cooling channels 14, 14', to be wicked by the wicking material 26.

Figure 11A:
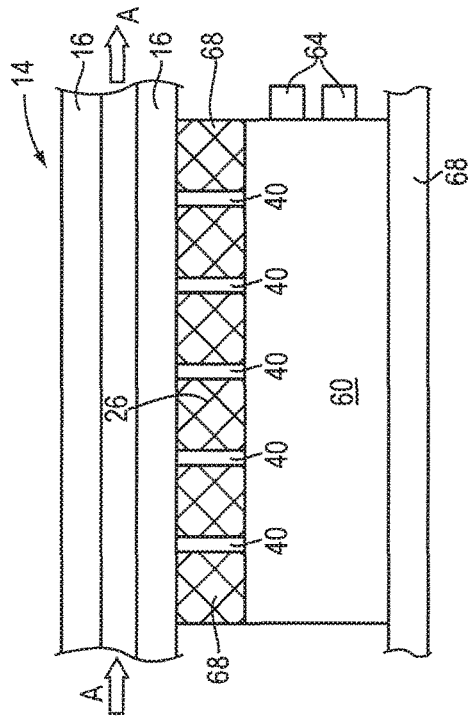
FIG. 11(A) is a front view of an embodiment of a "pouch" battery cell positioned adjacent to a cooling channel.

Referring also to FIGS. 11 (A), (B) and (C), it is not necessary that the cooling spaces 68 be located between the battery cells 60. The cooling spaces 68 may be located above (as shown), below, or both, the battery cells 60. FIG. 11(A) depicts the battery cells 60 stacked adjacent each other with the cooling space 68 above the battery cells 60. In this embodiment, the cooling spaces 68 again include the wicking material 26 and cooling liquid as discussed previously and define a vapor channel or hole 40 that extends from the top of the battery cell 60 to the wall 16 of the cooling channel 14. As discussed in other embodiments, cooling vapor passes through the channel and condenses on the wall 16 of the cooling channel 14.

Figure 11B:
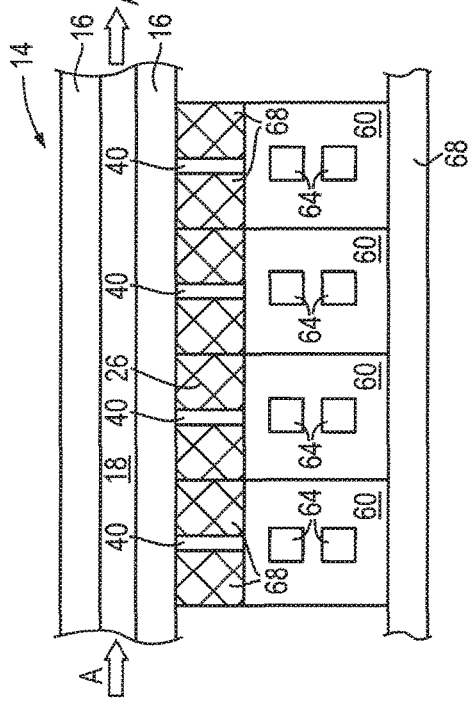
FIG. 11(B) is a side view of FIG. 1(A) with one embodiment of the cooling space.
Figure 11C:
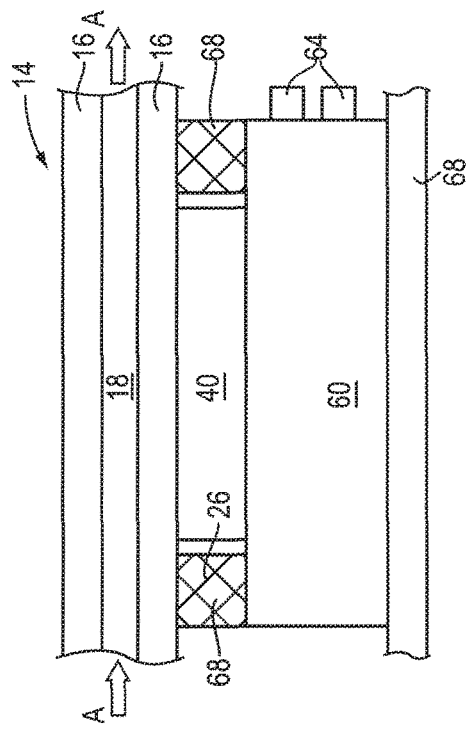
FIG. 11(C) is a side view of FIG. 1(A) with a second embodiment of the cooling space.

FIGS. 11(B) and 11(C) depict side views of FIG. 11(A) with two embodiments of the wicking material 26 in the cooling spaces 68. In FIG. 11(B), the wicking material 26 pervades the entire space between the top of the battery cells 60 and includes additional vapor holes or channels 40 throughout the wicking material 26, thus producing a 2-dimensional array of holes. In the embodiment of FIG. 11(C), the wicking material 26 is constrained to the front and back of the battery cells 60, with the remainder of the space being open, forming a single large hole or plenum 40.

The described cooling systems have the benefit of being closed, inexpensive and passive, with substantially no moving parts.

Unless otherwise indicated, all numbers expressing lengths, widths, depths, or other dimensions and so forth used in the specification and claims are to be understood in all instances as indicating both the exact values as shown and as being modified by the term "about." Accordingly, unless indicated to the contrary, the numerical parameters set forth in the specification and attached claims are approximations that may vary depending upon the desired properties sought to be obtained. At the very least, and not as an attempt to limit the application of the doctrine of equivalents to the scope of the claims, each numerical parameter should at least be construed in light of the number of reported significant digits and by applying ordinary rounding techniques. Any specific value may vary by 20%.

The terms "a," "an," "the," and similar referents used in the context of describing the invention (especially in the context of the following claims) are to be construed to cover both the singular and the plural, unless otherwise indicated herein or clearly contradicted by context. All methods described herein can be performed in any suitable order unless otherwise indicated herein or otherwise clearly contradicted by context. The use of any and all examples, or exemplary language (e.g., "such as") provided herein is intended merely to better illuminate the invention and does not pose a limitation on the scope of any claim. No language in the specification should be construed as indicating any non-claimed element essential to the practice of the invention.

Groupings of alternative elements or embodiments disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified, thus fulfilling the written description of all Markush groups used in the appended claims.

Certain embodiments are described herein, including the best mode known to the inventor for carrying out the spirit of the present disclosure. Of course, variations on these described embodiments will become apparent to those of ordinary skill in the art upon reading the foregoing description. The inventor expects skilled artisans to employ such variations as appropriate, and the inventor intends for the invention to be practiced otherwise than specifically described herein. Accordingly, the claims include all modifications and equivalents of the subject matter recited in the claims as permitted by applicable law. Moreover, any combination of the above-described elements in all possible variations thereof is contemplated unless otherwise indicated herein or otherwise clearly contradicted by context.

In closing, it is to be understood that the embodiments disclosed herein are illustrative of the principles of the claims. Other modifications that may be employed are within the scope of the claims. Thus, by way of example, but not of limitation, alternative embodiments may be utilized in accordance with the teachings herein. Accordingly, the claims are not limited to embodiments precisely as shown and described.

What is claimed is:

1. A cooling system for a battery cell having a top surface and a bottom surface, the cooling system comprising:
   a wicking material and a first cooling fluid disposed therein;
   a battery cell support configured to hold the battery cell in direct contact with the wicking material;
   a first cooling channel having a wall, the wall having an interior and an exterior surface, the interior surface of the wall of the first cooling channel defining a lumen, the exterior surface of the wall of the first cooling channel in direct contact with the wicking material;
   wherein the wicking material is a structural cylinder having a first diameter similar to a second diameter of the battery cell and defining a hole having a first end and a second end, the first end terminating adjacent the exterior surface of the wall of the first cooling channel, and
   wherein the battery cell support is configured to hold the battery cell such that a portion of the bottom surface of the battery cell is positioned over the second end of the hole;
   whereby a second cooling fluid, different from the first cooling fluid, is passed through the lumen of the first cooling channel, and
   whereby the first cooling fluid in the wicking material vaporizes in response to heat radiating from the battery cell, moves away from the bottom surface of the battery cell through the hole, condenses upon contact with the exterior surface of the wall of the first cooling channel, and is wicked by the wicking material to the battery cell once condensed.

2. The cooling system of claim 1, whereby the vaporized first cooling fluid transfers heat to the second cooling fluid via condensation of the first cooling fluid on the wall of the first cooling channel.

3. The cooling system of claim 1, whereby the battery support holds the bottom surface of the battery cell in direct contact with the wicking material.

4. The cooling system of claim 1, whereby the battery support holds a portion of the battery cell in direct contact with the wicking material.

5. The cooling system of claim 1, wherein the cooling system comprises at least two structural cylinders of wicking material interconnected by an extension of wicking material.

6. The cooling system of claim 1, wherein the wicking material is selected from a group consisting of high thermal conductivity materials including, but not limited to, copper, stainless steel, aluminum, carbon steel, silver, carbon fiber, and graphite.

7. The cooling system of claim 1, wherein the first cooling fluid is selected from a group consisting of two-phase fluids including, but not limited to, ammonia, Flutec PP I, Flutec PP3, Flutec PP6, Flutec PP2, Flutec PP9, Freon 11, Freon 113, alcohol, methanol (283-403 K), and ethanol (273-403 K).

8. The cooling system of claim 1, wherein the first cooling fluid is a thermal fluid optimized for phase change cooling between temperatures of 273K and 323K.

9. The cooling system of claim 1, wherein the second cooling fluid is selected from a group including, but not limited to, synthetic oil, ethylene glycol, water, a liquid dielectric, or combinations thereof.

10. The cooling system of claim 1, wherein the hole is parallel to a longitudinal axis of the battery cell.

11. The cooling system of claim 1, wherein the first cooling channel and the wicking material are positioned adjacent to a wall of the battery cell.

12. The cooling system of claim 1, wherein the first cooling channel and the wicking material are positioned adjacent to the top of the battery cell.

13. The cooling system of claim 1, further comprising a second cooling channel, the wicking material being positioned between the first and second cooling channels and defining a plurality of holes extending between the first and second cooling channels.

14. A cooling system for a battery cell having a top surface and a bottom surface, the cooling system comprising:
  a wicking material and a first cooling fluid disposed therein;
  a battery cell support configured to hold the battery cell in direct contact with the wicking material;
  a first cooling channel having a wall, the wall having an interior and an exterior surface, the exterior surface of the wall of the first cooling channel in direct contact with the wicking material;
  wherein the wicking material is a structural cylinder having a first diameter similar to a second diameter of the battery cell and defining a hole having a first end and a second end, the first end terminating adjacent the exterior surface of the wall of the first cooling channel, and
  wherein the battery cell support is configured to hold the battery cell such that a portion of the bottom surface of the battery cell is positioned over the second end of the hole,
  whereby a second cooling fluid, different from the first cooling fluid, is passed through the first cooling channel,
  whereby the first cooling fluid in the wicking material is reduced in viscosity in response to heat from the battery cell, moves away from the bottom surface of the battery cell through the hole, increased in viscosity upon contact with the wall of the first cooling channel, condenses on the exterior surface of the wall of the first cooling channel, and is wicked by the wicking material to the battery cell.

15. The cooling system of claim 13, whereby a portion of the first cooling transfers heat without undergoing a phase change.

16. A cooling system for a battery cell having a top surface and a bottom surface, the cooling system comprising:
  a wicking material;
  a first cooling fluid having a first state and a second state, the first cooling fluid disposed in the wicking material;
  a battery cell support configured to hold the battery cell in direct contact with the wicking material;
  a first cooling channel having a wall, the wall having an interior and an exterior surface, the exterior surface of the wall of the first cooling channel in direct contact with the wicking material;
  wherein the wicking material is a structural cylinder having a first diameter similar to a second diameter of the battery cell and defining a hole having a first end and a second end, the first end terminating adjacent the exterior surface of the wall of the first cooling channel, and
  wherein the battery cell support is configured to hold the battery cell such that a portion of the bottom surface of the battery cell is positioned over the second end of the hole,
  whereby a second cooling fluid, different from the first cooling fluid, is passed through the first cooling channel,
  whereby the first cooling fluid in the wicking material changes from the first state to the second state in response to heat from the battery cell moves away from the bottom surface of the battery cell through the hole, changes from the second state to the first state upon contact with the wall of the first cooling channel, condenses on the exterior surface of the wall of the first cooling channel, and is wicked by the wicking material to the battery cell.

* * * * *